(12) United States Patent
Herkel et al.

(10) Patent No.: US 9,376,289 B2
(45) Date of Patent: Jun. 28, 2016

(54) ELEVATOR CONTROL SYSTEM WITH SLEEP MONITOR

(75) Inventors: Peter Herkel, Berlin (DE); Juergen Gewinner, Berlin (DE); Axel S. Pfeffer, Berlin (DE); Dirk H. Tegtmeier, Berlin (DE); Gianfranco Giannini, Berlin (DE); Michael Mann, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 463 days.

(21) Appl. No.: 13/976,560

(22) PCT Filed: Dec. 28, 2010

(86) PCT No.: PCT/US2010/062223
§ 371 (c)(1),
(2), (4) Date: Jun. 27, 2013

(87) PCT Pub. No.: WO2012/091696
PCT Pub. Date: Jul. 5, 2012

(65) Prior Publication Data
US 2013/0270045 A1    Oct. 17, 2013

(51) Int. Cl.
*B66B 1/28* (2006.01)
*B66B 1/14* (2006.01)
*B66B 1/34* (2006.01)

(52) U.S. Cl.
CPC ... *B66B 1/14* (2013.01); *B66B 1/34* (2013.01); *Y02B 50/127* (2013.01)

(58) Field of Classification Search
CPC ........... B66B 1/24; B66B 1/34; Y02B 50/127
USPC ........................ 187/247, 289, 293, 391, 393
See application file for complete search history.

(56) References Cited

U.S. PATENT DOCUMENTS

| 7,246,689 | B2 * | 7/2007 | Huff | B66B 1/34 187/395 |
| 7,755,223 | B2 * | 7/2010 | Fitzgibbon | E05F 15/603 187/317 |
| 7,866,446 | B2 * | 1/2011 | Lindegger | B66B 1/2408 187/316 |
| 7,909,143 | B2 * | 3/2011 | Tyni | B66B 1/2458 187/247 |

(Continued)

FOREIGN PATENT DOCUMENTS

| CN | 201102852 Y | 8/2008 |
| CN | 101792080 A | 8/2010 |

(Continued)

OTHER PUBLICATIONS

Chinese Search Report for application CN 201080070965.8, mailed Dec. 28, 2010, 2 pages.

(Continued)

*Primary Examiner* — Anthony Salata
(74) *Attorney, Agent, or Firm* — Cantor Colburn LLP (57) ABSTRACT

An elevator control system includes a control power supply, a computing core in communication with the control power supply, a communication power supply in communication with the computing core, and a sleep monitor in communication with the control power supply, the computing core, and the communication power supply. The sleep monitor is disposed to selectively turn on/off the control power supply and the computing core, and the sleep monitor is disposed to selectively change an operating state of the communication power supply to a low voltage state.

17 Claims, 5 Drawing Sheets

(56) References Cited

U.S. PATENT DOCUMENTS

| | | | | |
|---|---|---|---|---|
| 8,689,944 | B2* | 4/2014 | Manfredi | B66B 1/30 187/289 |
| 9,016,440 | B2* | 4/2015 | Finschi | B66B 1/2458 187/382 |
| 2006/0108181 | A1* | 5/2006 | Bacellar | B66B 1/34 187/247 |
| 2014/0008152 | A1* | 1/2014 | Annen | B66B 5/0037 187/247 |
| 2014/0008155 | A1* | 1/2014 | Rossignol | B66B 1/302 187/290 |
| 2015/0122589 | A1* | 5/2015 | Mezzadri | B66B 1/306 187/290 |
| 2015/0203328 | A1* | 7/2015 | Horbrugger | B66B 1/302 187/290 |

FOREIGN PATENT DOCUMENTS

| | | |
|---|---|---|
| EP | 1867594 | 12/2007 |
| JP | S5860661 A | 4/1983 |
| JP | S59227670 A | 12/1984 |
| JP | 2003054846 A | 2/2003 |
| JP | 2004083151 A | 3/2004 |
| JP | 2005162441 A | 6/2005 |
| JP | 2005162444 A | 6/2005 |
| JP | 2005212921 A | 8/2005 |
| JP | 2006143449 A | 6/2006 |
| KR | 20070065345 A | 6/2007 |
| KR | 100908347 B1 | 7/2009 |
| WO | 2010040899 A1 | 4/2010 |
| WO | 2012091696 A1 | 7/2012 |

OTHER PUBLICATIONS

Japanese Office Action for application JP 2013-547408, mailed Sep. 2, 2014, 3 pages.

Notification of Transmittal of the International Search Report and the Written Opinion of the International Searching Authority, or the Declaration; PCT/US2010/062223; Sep. 26, 2011.

International Preliminary Report on Patentability and Written Opinion of the International Searching Authority for International Application No. PCT/US2010/062223, Jul. 11, 2013, 5 pages.

* cited by examiner

FIG. 5 of # ELEVATOR CONTROL SYSTEM WITH SLEEP MONITOR

FIELD OF INVENTION

The subject matter disclosed herein relates generally to the field elevator control systems, and more particularly to control of standby operations of elevators.

DESCRIPTION OF RELATED ART

Generally, elevator control systems remain active in order to detect requests for elevator activation from devices in communication with the elevator control systems. For example, in a conventional elevator control system, a plurality of remote stations are in communication with a central controller. Each remote station may include an elevator request button (e.g., up/down elevator access button). Upon selection or depressing of a button, the elevator control system directs an elevator to service the request. In order to maintain communication with each remote station the elevator control system may remain in an active or powered-on state.

BRIEF SUMMARY

According to one aspect of the invention, an elevator control system includes a control power supply, a computing core in communication with the control power supply, a communication power supply in communication with the computing core, and a sleep monitor in communication with the control power supply, the computing core, and the communication power supply. The sleep monitor is disposed to selectively turn on/off the control power supply and the computing core, and the sleep monitor is disposed to selectively change an operating state of the communication power supply to a low voltage state.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of an elevator control system include control systems disposed and configured to power down power-hungry portions of an elevator system while maintaining communication with a plurality of remote stations. Example embodiments of the present invention are described in detail below.

Figure 1:
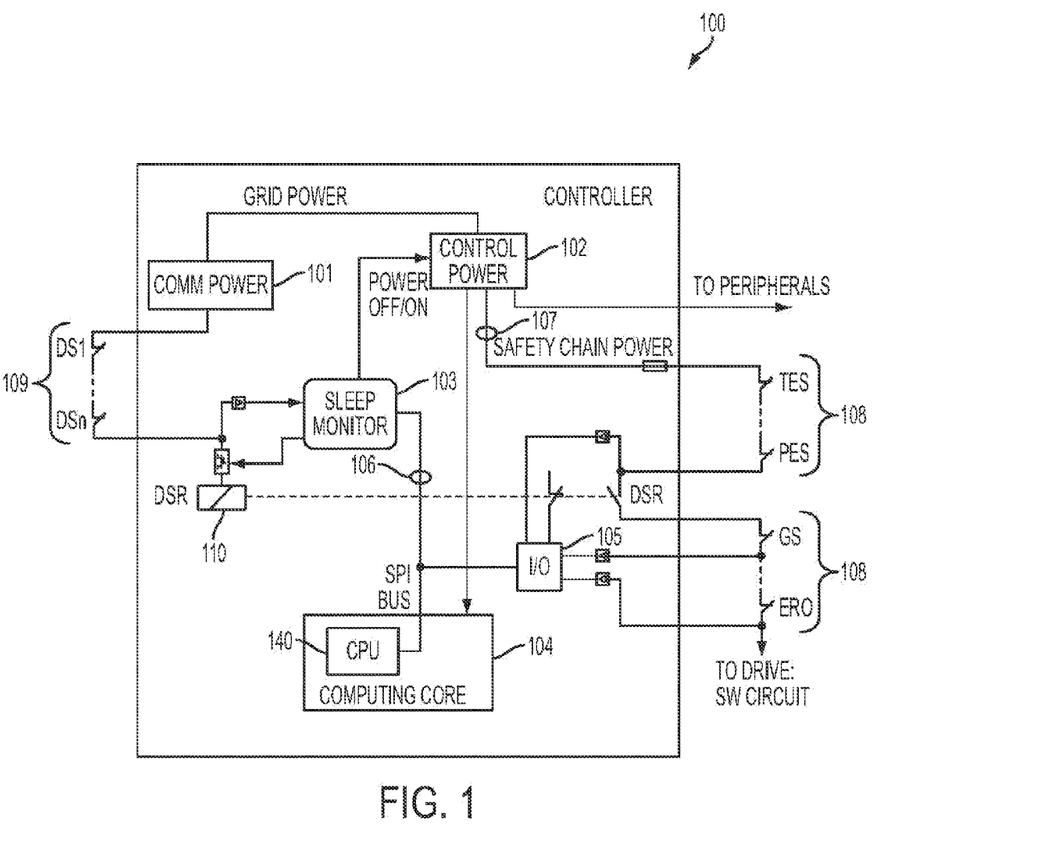
FIG. 1 illustrates an elevator control system, according to an example embodiment.

Turning to FIG. 1, an elevator control system 100 is illustrated. The system 100 may include power supplies 101 and 102. The power supply 102 may be a control power supply configured to provide power to the system 100. The power supply 101 may be a door switch power supply configured to provide power to a plurality of door switches 109. The door switches 109 may be in communication with the communication power supply 101. The system 100 further includes door switch monitor (DSR) 110 in communication with the door switches 109. The DSR 110 may monitor the state of the door switches 109, and provide an output signal indicative of the state of the monitored door switches. For example, if a door switch is in an inactive state (e.g., closed), the DSR 110 may provide a door switch closed status. If a door switch is in an active state (e.g., open), the DSR 110 may provide a door switch open status. Each of the door switches 109 may be arranged to detect the mechanical/physical status of a door (e.g., hoistway access door, elevator door, etc). Furthermore, each of the door switches 109 may be a limit switch or other suitable switch, configured to remain in physical contact with the door to detect the door's physical state.

Turning back to FIG. 1, the system 100 further includes computing core 140 in communication with the power supply 102. The computing core 104 may be a computer processor, electronic state machine, micro-controller, or any other suitable controller disposed and configured to execute a set of instructions which monitor the status of portions of the system 100, and provide elevator control operations. The computing core 104 may be in communication with an I/O bus 105, which is in further communication with a plurality of remote devices 108. For example, the remote devices 108 may be switches, remote stations, or any other portion of an elevator system configured to detect a state of the system. For example, as illustrated, the remote devices 108 are safety devices powered through control power supply 102 with bus 107.

The system 100 further includes a sleep monitor 103, configured and disposed to monitor the switches 109. The sleep monitor 103 may be a computer processor, electronic state machine, micro-controller, or any other suitable controller disposed and configured to execute a set of instructions which monitor the status of portions of the system 100 while consuming very little power.

The sleep monitor is configured to establish a low power mode, minimal power mode, or "sleep" mode which drastically reduces the power consumed by an elevator system.

The sleep monitor may be in communication with the computing core 104 over SPI bus 106, or may be implemented in combination with computing core 104 (e.g., dual core or dual-purpose core with low-power and regular-power modes). In a situation where the switches 109 are in an inactive state for a desired or predetermined amount of time, the computing core may enter a low power sleep mode and transmit a signal indicative of this sleep mode to the sleep monitor 103. In response to the signal, the sleep monitor 103 may direct the control power supply 102 and the DSR 110 to also enter the low power sleep mode. For example, the sleep monitor 103 may turn off power supply 102 and sever power to the DSR 110.

During the low power sleep mode, the sleep monitor may be configured to detect the status of the switches 109. Upon a change of state of any of the switches 109, the sleep monitor 103 may direct the computing core 104 to activate through CPU 140, and may power on the control power supply 102.

As described above, the low power sleep mode includes powering down control power supply 102, DSR 110, and computing core 104. It is apparent that with these portions of the system 100 powered down, power use by the system 100 may be reduced while still maintaining communication with remote portions of the system 100 (i.e., switches 109) through the sleep monitor 103. Hereinafter, a more detailed description of low power sleep mode is described with reference to FIGS. 2-3.

Figure 2:
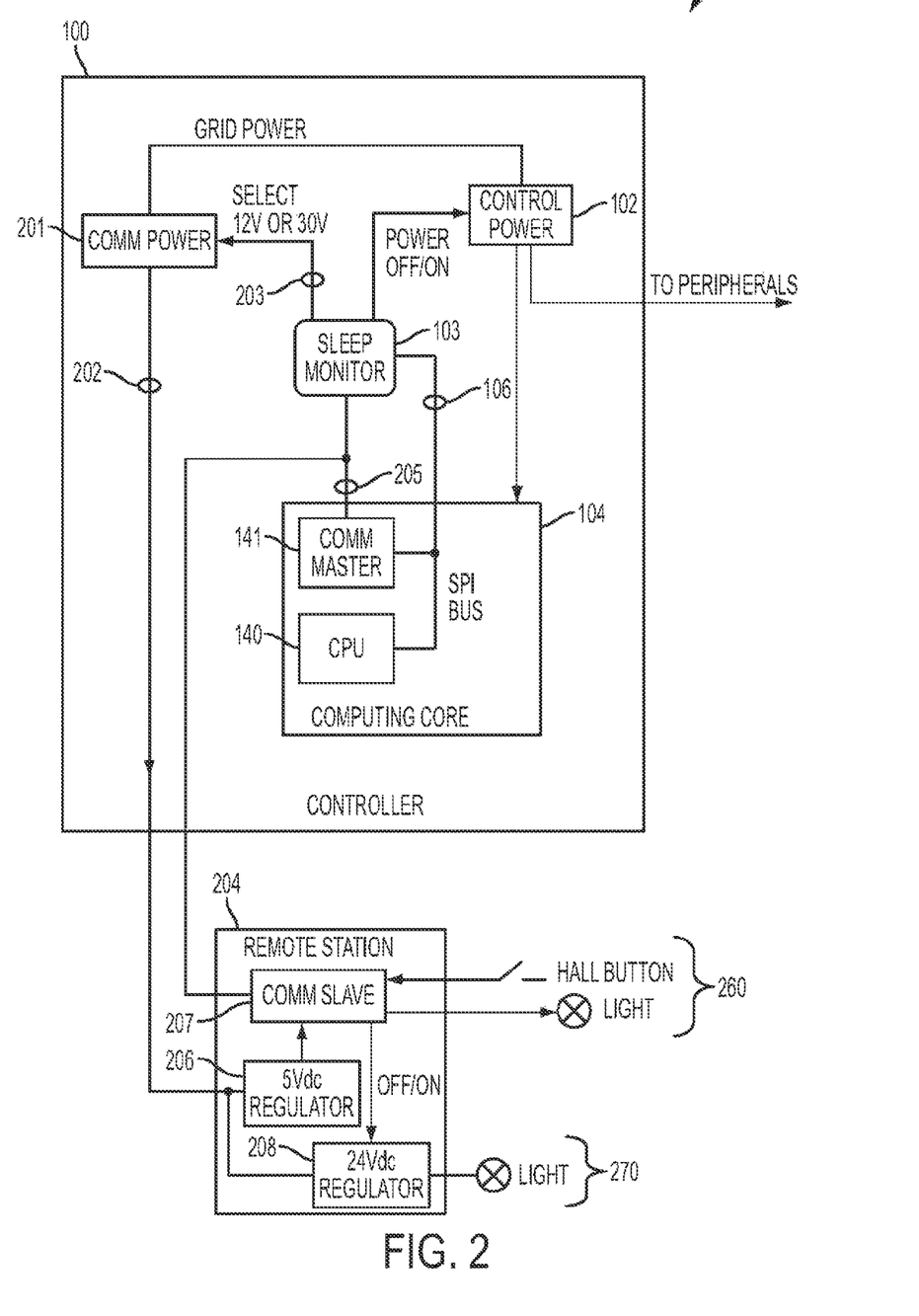
FIG. 2 illustrates an elevator control system, according to an example embodiment.

Turning to FIG. 2, an elevator control system 200 is illustrated. The system 200 may include the sleep monitor 103, the power supply 102, and the computing core 104. The system 200 may further include communication power supply 201 in communication with the sleep monitor 103. The system 200 may further include remote station 204 in communication with the power supply 201, over power bus 202. The remote station 204 is in further communication with the computing core 104 and the sleep monitor 103 over communication bus 205.

The computing core 104 includes communication portion 141 to enable serial communications over the communication bus 205. The remote station 204 includes a communications portion 207 configured to communicate with the communication portion 141 of the computing core 104. For example, the communication portions 141 may be configured as a master device with the communication portion 207 configured as a slave device. Furthermore, the sleep monitor 103 may include a communications portion (not illustrated) configured to be a master device in sleep mode, and a slave device if the system 200 is active.

The remote station 204 further includes a plurality of remote devices 260 and 270 in communication with the communication portion 207. For example, the remote devices 260 may be low-power devices which may remain active in sleep mode. The remote devices 260 may include elevator request device (i.e., to call in an elevator to floor), low power indicator lights (e.g., to signal elevator is in low power standby), or other suitable devices. Further, the devices 270 may be non-essential devices which may be powered off in sleep mode. For example, the non-essential devices may include lighting devices.

As described above, after a predetermined or desired amount of time where the elevator system 200 is inactive (i.e., no floor requests, door state changes, etc), the computing core 104 may direct the sleep monitor to enter low power sleep mode. In response, the sleep monitor 103 may direct control power supply 102 to power off. Additionally, the sleep monitor 103 may direct the power supply 201 to enter a low-voltage state. In this manner, the power supply 201 provides less power to the system 200. In order to maintain communications under a low voltage state of the power supply 201, in response to entering the low voltage state, the power supply 201 directs/requests the communication device 207 to turn off power to non-essential devices 270. The communications device, in response to this request, the communication device 207 may utilize a low voltage to remain active for monitoring the devices 260. For example, the communications device 207 may only consume enough power to remain in communication with the devices 260 and the sleep monitor 103.

As described above, in a low power sleep mode, the system 200 turns off all non-essential portions of the system 200, switches communication power to a low voltage state. As non-essential portions of the system are turned off, and communications consumes a lower voltage, the system 200 may still monitor the status of remote devices through sleep monitor 103 while consuming less power. Furthermore, similarly as noted above with regards to system 100, in the event of a change of state of devices being monitored through sleep monitor 103, the sleep monitor may activate the computing core 104, turn on control power supply 102, and enable higher voltage operation of the communication power supply 201. Thereafter, the system 200 operates in a fully active state.

Further to the description above, control portions of an elevator car itself may be lowered in a low power sleep mode.

Figure 3:
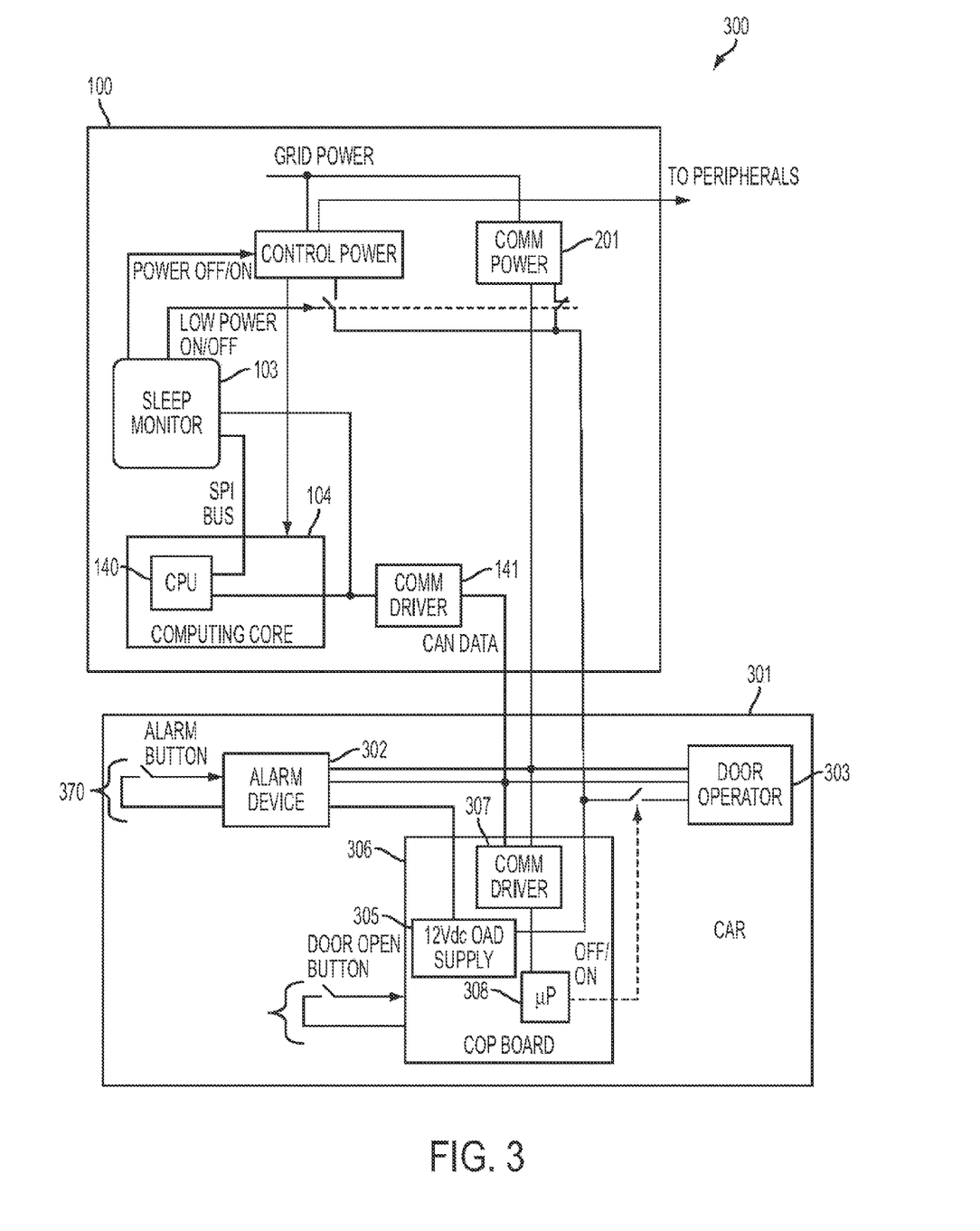
FIG. 3 illustrates an elevator control system, according to an example embodiment.

Turning to FIG. 3, an elevator control system 300 is illustrated. The elevator control system 300 may include communication power supply 201, control power supply 102, sleep monitor 103, computing core 104, and communication driver 141. Furthermore, the system 300 may include elevator car control portion 301.

The elevator car control portion 301 may include an alarm device 302, a door operating device 303, and a communication controller 306 in communication with the computing core 104 and the sleep monitor 103. The elevator car control portion 301 may further include devices 360 and 370 in communication with the control portion 304. For example, devices 370 may be non-essential devices. The devices 360 may be essential devices such as door switches, open-door request buttons (i.e., to detect if a passenger is in a car), fire-key override switches, or any other suitable devices.

As described above, after a predetermined or desired amount of time where the elevator system 300 is inactive (i.e., no floor requests, door state changes, etc), the computing core 104 may direct the sleep monitor to enter low power sleep mode. In response, the sleep monitor 103 may direct control power supply 102 to power off. Additionally, the sleep monitor 103 may direct the power supply 201 to enter a low-voltage state. In this manner, the power supply 201 provides less power to the system 300. In order to maintain communications under a low voltage state of the power supply 201, in response to entering the low voltage state, the power supply 201 directs/requests the elevator car control portion 301 to turn off power to non-essential devices 370. The control portion 301, in response to this request, directs a communication device 307 to utilize a low voltage but remain active for monitoring the devices 360. For example, the communications device 307 may only consume enough power to remain in communication with the devices 360 and the sleep monitor 103. Furthermore, in response to entering low power sleep mode, the control portion 301 may turn off door operating control 303. The alarm device 302 may remain active, or may be turned off in a low power sleep mode depending upon any desired implementation. For example, the alarm device may be in communication with non-essential devices 370. The non-essential devices may include alarm system components which will be activated and ready for use once the elevator car wakes from sleep mode. Thus, it may be possible for the alarm device 302 to be turned off in sleep mode. Furthermore, although not illustrated, it should be understood that other non-essential devices may be in communication with the controller 301. These other devices may include elevator car lighting, display screens, video monitors, audio speakers/music systems, and other non-essential devices.

As described above, in a low power sleep mode, the system 300 turns off all non-essential portions of the system 300, switches communication power to a low voltage state. As non-essential portions of the system are turned off, and communications consumes a lower voltage, the system 300 may still monitor the status of remote devices through sleep monitor 103 while consuming less power. Furthermore, similarly as noted above with regards to system 100 and system 200, in the event of a change of state of devices being monitored through sleep monitor 103, the sleep monitor may activate the computing core 104, turn on control power supply 102, and enable higher voltage operation of the communication power supply 201. Thereafter, the system 300 operates in a fully active state.

In addition to low-power modes of elevator controls utilizing the systems 100-300 described above, example embodiments may provide extreme low-power modes which may include regenerative power systems to enable relatively minimal power consumption from grid power in standby/sleep operation of an elevator system.

Figure 4:
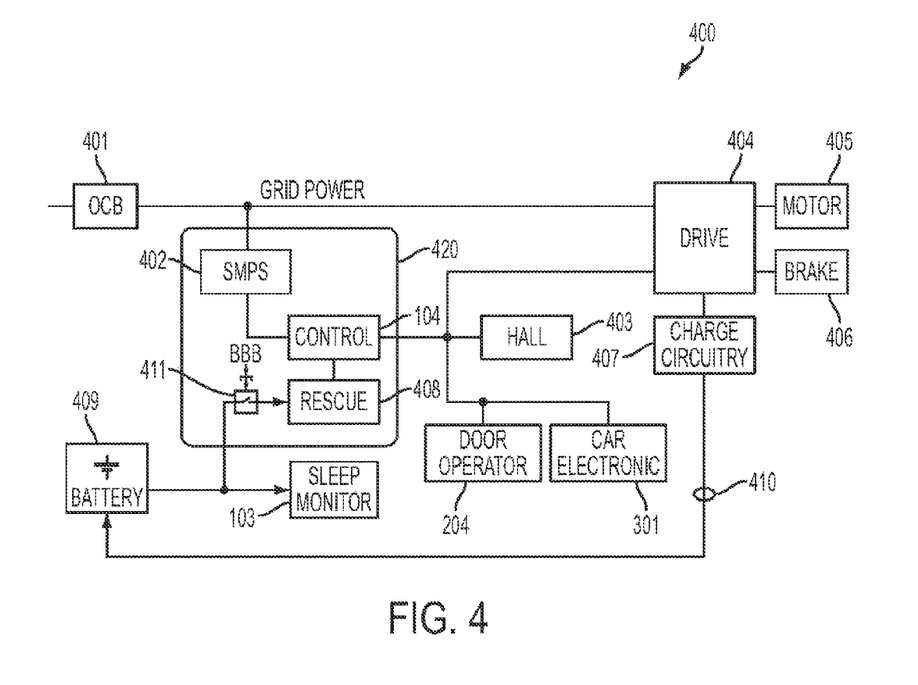
FIG. 4 illustrates an elevator control system, according to an example embodiment.

Turning to FIG. 4, an elevator control system 400 is illustrated. As shown, system 400 includes overcurrent circuit breaker (OCB) 401 in communication with control portion 420 and drive 404. The drive 404 may be an elevator drive configured to mechanically move an elevator car, for example, which may include car electronics 301.

The drive 404 may be in communication with motor 405, brake 406, charge circuitry 407, and control portion 420. The motor 405 may be in mechanical communication or otherwise attached to an elevator car. In response to control power provided by drive 404, the motor may move the elevator car generally in two directions (e.g., up and down). The brake 406 is configured to slow or stop the elevator car in response to control signals received from the drive 404.

Charge control circuitry 407 may be circuitry configured to redirect regenerative power produced at motor 405 to battery 409 over charge medium 410. For example, if an elevator car is moving in a direction in which gravity assists the force needed to move the car (e.g., down), the motor 405 may not be powered, and thus may generate electrical power. Thus, charge control circuitry 407 may redirect this electrical energy to charge the battery 409. The redirected energy may be direct current or alternating current. If direct current, the battery 409 may be relatively directly charged. If alternating current, the energy may be rectified to charge the battery 409. Further, the battery 409, circuitry 497, and/or charge medium 410 may include surge suppressive circuitry, rectification circuitry, voltage regulating circuitry, or any other suitable circuitry to enable efficient and safe charging of the battery 409. Further, the battery 409 may be in communication with sleep monitor 103, which is in further communication with control portion 420.

Control portion 420 includes a switched mode power supply (SMPS) 402 and a rescue control portion 408. The SMPS 402 may be a power supply including a switching system to increase overall efficiency compared to a linear power supply. Any suitable SMPS may be used to implement SMPS 402. The SMPS 402 may incorporate electrical filters to limit or suppress noise, or may omit these filters if electrical noise is not apparent. The rescue control portion 408 may be a processor or apparatus configured to communicate with a computing core 104 to establish a request for a manual or automatic rescue operation. In response to this request, the computing core 104 may switch the elevator control system 400 into a fully operational rescue state from a "sleep" or low-power state. The low-power state may be facilitated through sleep monitor 103, which is in severable communication with rescue portion 408 through breaker 411. The battery 409 is also in severable communication with rescue portion 408 through breaker 411. Therefore, rescue portion 408 may share power from battery 409, thereby reducing otherwise redundant battery use for both sleep mode and rescue power.

With regard to the low-power state, it should be appreciated that as sleep monitor 103 is powered directly by battery 409 when in a sleep mode or low power mode, there is minimal or no power consumed from the power grid. Furthermore, as the battery 409 is charged using regenerative power, there is minimal power consumed from the power grid for charging the battery 409. For example, as a conventional elevator typically makes several trips between floors per day, there is a relatively significant amount of regenerative power produced daily. Thus, otherwise wasted regenerative energy may be redirected for use by the sleep monitor 103, which is facilitated by batter 409.

Furthermore, depending upon daily usage of an elevator, the battery 409 may store enough of the regenerative energy to maintain power to the sleep monitor 103 without any power use from the electrical grid. This self-sustaining sleep-mode operation may be further facilitated through use of an efficient battery, for example, a lithium polymer or lithium phosphate battery. One suitable battery may be formed of lithium iron phosphate, which has a relatively long lifetime, a high number of load cycles, high percentage of capacity use, limited or no hazardous materials, and is less expansive than other lithium technologies. However, it should be noted that any battery with sufficient capacity may be equally applicable, depending upon any desired application.

It is noted that although systems 100-400 have been described separately, any combination of portions or the entirety of any of these systems may be applied in an implementation of the invention. For example, low-power modes, battery-powered sleep modes, monitoring sleep systems, and or other features may be implemented together or separately through inclusion of any of the components described in detail above.

Thus, as described above and according to example embodiments, elevator control systems are provided which conserve power while maintaining communication with a plurality of elevator remote stations, which also offer significantly increased efficiency compared with conventional systems. Example embodiments reduce the total number of powered elevator control system portions during a low-power mode, while maintaining critical components to ensure safety of the elevator system. For example, critical portions/controls may include sensors/switches to detect an elevator request (i.e., floor request), alarm portions, unauthorized access detection, and/or other critical systems to maintain system and passenger safety. The technical effects and benefits of example embodiments include reduced power use by elevator control systems.

In addition to the systems 100-400 described above, methodologies for control of these elevator control systems are also provided below.

Figure 5:
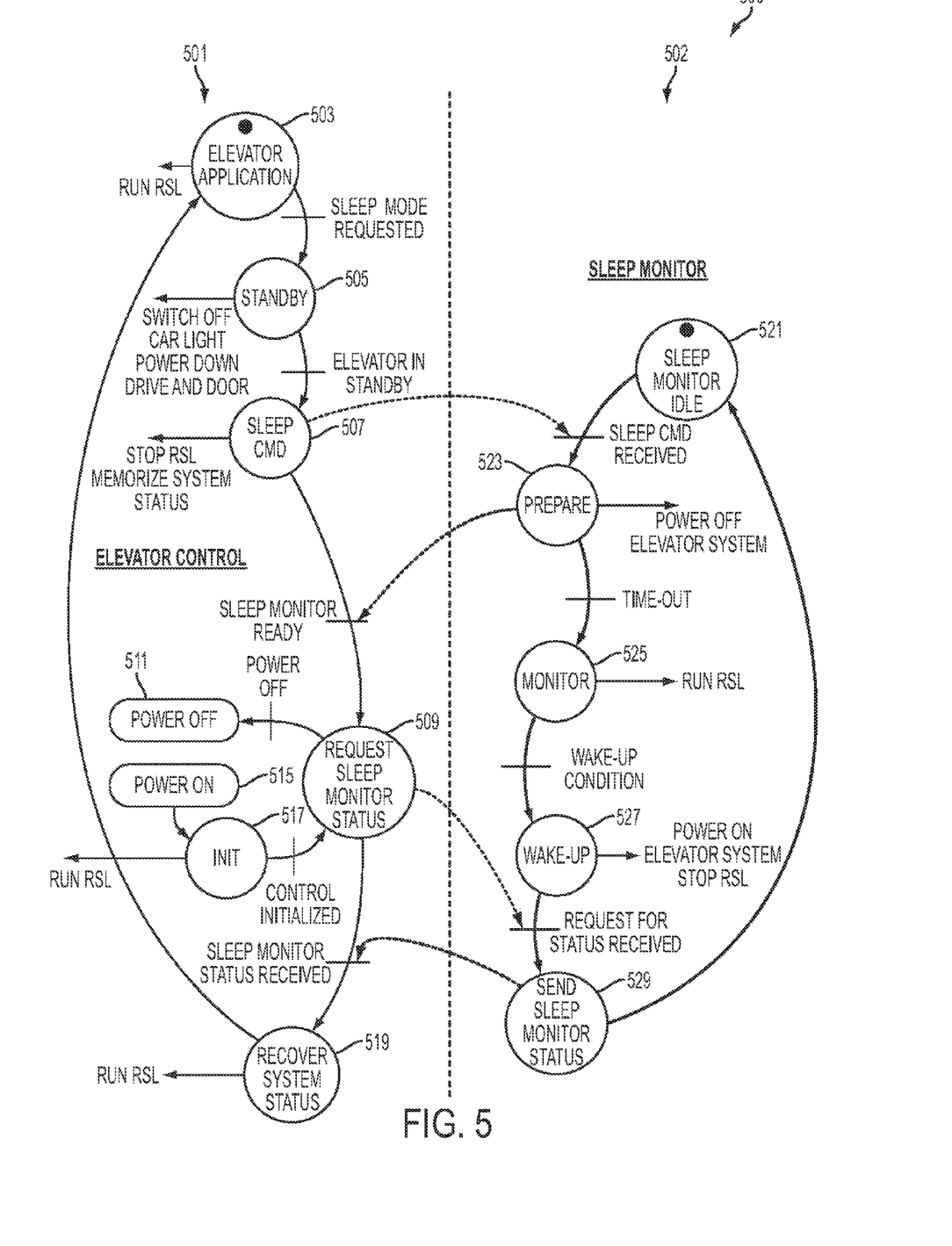
FIG. 5 illustrates a control methodology for an elevator control system, according to an example embodiment.

Turning to FIG. 5, a control methodology for an elevator control system is illustrated. The method 500 depicts synchronization between normal elevator operation and sleep mode, how the elevator control system enters sleep mode, and how it transitions from sleep mode to normal elevator control.

The method 500 includes an elevator control methodology 501 and a sleep monitor control methodology 502, which both operate in synchronization as illustrated through the directed lines illustrated.

The method 501 includes initiating an elevator application at block 503. Initiating the elevator application may include running communications between elevator systems, and monitoring for any external requests (i.e., floor request, sleep requests, etc.). The method 501 further includes initiating a standby mode in response to a sleep request at block 505. Standby mode is a state of the elevator control system with very low or lowest possible power consumption, and with most or all non-critical components switched off. The sleep request is initiated by the elevator control system itself; and may be derived from a predetermined or desired amount of time the elevator system remains out of use, through a remote service call, service application, or through any other suitable process which determines whether sleep mode is applicable to a current state of the elevator control system. Initiating standby mode may include switching off lights and powering down non-critical elevator systems, and indicating that the elevator car and elevator control system is in standby mode. In response to this indication, the method 501 includes issuing a sleep command at block 507. Issuing the sleep command may include stopping or halting the elevator communication system and control system as described above, and transmitting the sleep command to the sleep monitor. Thus, with most of the elevator control system powered off, sleep mode reduces power consumption dramatically.

The method 501 further includes requesting sleep monitor status at block 509 in response to a sleep monitor ready transmission (e.g., transmitted from the sleep monitor). For example, in response to the sleep monitor indicating that the elevator system is actively in sleep mode, the method 501 continually monitors or waits for a "wake" or recover signal from the sleep monitor.

Further, a power-off request may be received at block 511, where in response to receipt, the method 501 may begin to power-off the elevator control system and enter sleep mode.

The method 501 may further include receiving a power-on request at block 515. Thereafter, or in response to this request, the method 501 may include initializing communications at block 517, recovering system status at block 519, and initiating the elevator application at block 503.

Block 515 may be initiated and/or executed while the system is in sleep mode or standby mode. More clearly, in block 509 the elevator control system requests the status of the sleep monitor. Block 515 may be executed after the elevator control system receives a power off request from the sleep monitor, and/or upon receipt of information from the sleep monitor based on the request issued from block 509. The received information may include a reason a power-on request was transmitted from block 525 to block 517; for example, an indication a hall call button has been pressed or limit switch tripped.

Further, block 515 may be executed while waiting for the elevator control system to power off. In some circumstances, the elevator control may have initiated a sleep mode transition and set the elevator in standby, and the sleep monitor has started sleep mode preparations (block 525). There may be a relatively short period of time where the computing core is still working (e.g., due to remaining power for control electronics) and the sleep monitor is operating. If in that period of time a passenger calls the elevator by pressing the hall button or some other event triggers a power-on or wake request, the sleep monitor will execute the wake-up block 527 and reactivate the elevator control system without a power-off-power-on cycle.

With regards to sleep monitor control, the method 502 established operations performed through the sleep monitor 103. The method 502 includes maintaining a sleep monitor idle state at block 521, until a sleep command is received. In response to the sleep command, the method 502 includes preparing for sleep mode at block 523. Preparing for sleep mode includes powering off the elevator system as described above with regard to systems 100-400, and transmitting a sleep monitor ready command. Thereafter, the method 502 includes monitoring critical elevator system components at block 525. If a critical component is activated or disturbed, the method 502 includes establishing a wake up condition and waking up the system at block 527. For example, waking up the system includes powering on elevator system communications and transmitting the sleep monitor awake status at block 529. Thereafter, the method 502 includes maintaining a sleep monitor idle status at block 521.

As described above, control methodologies of example embodiments provide synchronization between traditional elevator control system components and the novel sleep monitor processor. The sleep monitor processor is configured to execute computer executable instructions mimicking the control methodology 501, which computing cores of an elevator control system include additional computer executable instructions to facilitate the control methodology 501 while also providing execution of other instructions to facilitate proper elevator operation.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An elevator control system, comprising:
a control power supply;
a computing core in communication with the control power supply;
a communication power supply in communication with the computing core; and
a sleep monitor in communication with the control power supply, the computing core, and the communication power supply;
wherein, the sleep monitor is disposed to selectively turn on/off the control power supply and the computing core, and the sleep monitor is disposed to selectively change an operating state of the communication power supply to a low voltage state.

2. The system of claim 1, further comprising:
a plurality of remote devices in communication with the computing core and the sleep monitor.

3. The system of claim 2, wherein the computing core is disposed to, after a predetermined amount of time, request the sleep monitor to monitor a state of each device of the plurality of devices.

4. The system of claim 3, wherein the sleep monitor is configured to turn off the computing core and turn off the control power supply in response to the request.

5. The system of claim 1, further comprising an elevator car control portion.

6. The system of claim 5, wherein the elevator car control portion includes communication device in communication with the computing core, the sleep monitor, and the communication power supply.

7. The system of claim 6, wherein the elevator car control portion further includes an essential remote device and a non-essential remote device.

8. The system of claim 7, wherein the essential remote device is a door switch.

9. The system of claim 7 wherein the non-essential device is an alarm monitoring device.

10. The system of claim 7, wherein the computing core is disposed to, after a predetermined amount of time, request the sleep monitor to monitor a state of the essential device.

11. The system of claim 10, wherein the sleep monitor is configured to turn off the computing core and turn off the control power supply in response to the request.

12. The system of claim 1, further comprising a remote station, wherein the remote station includes an elevator request device.

13. The system of claim 12, wherein the computing core is disposed to, if after a predetermined amount of time of inactivity of the elevator request device has elapsed, request the sleep monitor to monitor a state of the elevator request device.

14. The system of claim 13, wherein the sleep monitor is configured to turn on the computing core and turn on the control power supply in response to the request.

15. The system of claim 1, further comprising:
   a plurality of essential devices in communication with the computing core and the sleep monitor, wherein the essential devices include door switch devices and door request devices.

16. The system of claim 15, wherein the computing core is disposed to, after a predetermined amount of time, request the sleep monitor to monitor a state of each device of the plurality of essential devices.

17. The system of claim 16, wherein the sleep monitor is configured to turn off the computing core, turn off the control power supply, and switch the communication power supply to a low voltage state in response to the request.

* * * * *